(12) United States Patent
Xu et al.

(10) Patent No.: US 9,735,468 B2
(45) Date of Patent: Aug. 15, 2017

(54) ANTENNA ARRAY CONTROL APPARATUS, METHOD, AND SYSTEM

(71) Applicant: Huawei Technologies Co., Ltd., Shenzhen (CN)

(72) Inventors: Xiangning Xu, Shanghai (CN); Lichang Wu, Shenzhen (CN); Xiangyang Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 15/005,879

(22) Filed: Jan. 25, 2016

(65) Prior Publication Data

US 2016/0141752 A1 May 19, 2016

Related U.S. Application Data

(63) Continuation of application No. PCT/CN2014/083156, filed on Jul. 28, 2014.

(30) Foreign Application Priority Data

Jul. 26, 2013 (CN) .......................... 2013 1 0321264

(51) Int. Cl.
*H01Q 1/12* (2006.01)
*H01Q 3/12* (2006.01)
(Continued)

(52) U.S. Cl.
CPC .............. *H01Q 3/12* (2013.01); *H01Q 1/246* (2013.01); *H01Q 3/005* (2013.01); *H01Q 3/32* (2013.01); *H01Q 21/00* (2013.01); *H04B 1/40* (2013.01)

(58) Field of Classification Search
CPC .............. H01Q 3/12; H01Q 21/00; H04B 1/40
(Continued)

(56) References Cited

U.S. PATENT DOCUMENTS 3,803,618 A * 4/1974 Coleman .............. H01Q 3/2647
342/373
3,864,680 A * 2/1975 Hannan .................... H01Q 3/34
342/406

(Continued)

FOREIGN PATENT DOCUMENTS

| CN | 101232123 A | 7/2008 |
| CN | 101827374 A | 9/2010 |

(Continued)

*Primary Examiner* — Bentsu Ro
(74) *Attorney, Agent, or Firm* — Leydig, Voit & Mayer, Ltd.

(57) ABSTRACT

The embodiments of the present application disclose an antenna array control apparatus, method, and system. The apparatus includes a link establishing unit, multiple modems, and multiple AISG interfaces, and the AISG interfaces are configured to receive an antenna array configuration signal; the multiple modems are connected to the link establishing unit, and the modems are configured to decode the antenna array configuration signal to obtain an antenna array configuration instruction; and the link establishing unit is connected to multiple electric motors and configured to establish a communications link between each electric motor and one modem according to the antenna array configuration instruction. The multiple AISG interfaces are used in the apparatus as control ports, and a communications link between an antenna array and the multiple AISG interfaces can be connected in multiple manners, so that multiple antenna arrays are more flexibly controlled.

14 Claims, 10 Drawing Sheets

(51) Int. Cl.
*H01Q 21/00* (2006.01)
*H01Q 1/24* (2006.01)
*H01Q 3/00* (2006.01)
*H01Q 3/32* (2006.01)
*H04B 1/40* (2015.01)

(58) Field of Classification Search
USPC ............... 318/264–266, 272, 275, 277, 282, 318/466–469, 626; 343/700, 751, 754, 343/757, 758, 766
See application file for complete search history.

(56) References Cited

U.S. PATENT DOCUMENTS

| | | | | |
|---|---|---|---|---|
| 4,376,281 A | * | 3/1983 | Smith | H01Q 21/005 343/768 |
| 4,800,390 A | * | 1/1989 | Searle | H04B 1/713 342/383 |
| 6,239,744 B1 | * | 5/2001 | Singer | H01Q 1/246 342/359 |
| 7,580,674 B2 | * | 8/2009 | Gorsuch | H01Q 1/22 330/277 |
| 2010/0113097 A1 | | 5/2010 | Seeor et al. | |
| 2012/0033718 A1 | | 2/2012 | Kauffman et al. | |
| 2012/0257632 A1 | | 10/2012 | Wang et al. | |
| 2012/0317257 A1 | | 12/2012 | Yi | |
| 2013/0127666 A1 | * | 5/2013 | Zhang | H01Q 1/246 342/359 |

FOREIGN PATENT DOCUMENTS

| | | |
|---|---|---|
| CN | 102217208 A | 10/2011 |
| CN | 102780090 A | 11/2012 |
| CN | 103414020 A | 11/2013 |
| EP | 1067626 A2 | 1/2001 |
| EP | 1204163 A2 | 5/2002 |

* cited by examiner

ANTENNA ARRAY CONTROL APPARATUS, METHOD, AND SYSTEM

CROSS-REFERENCE TO RELATED APPLICATIONS

This application is a continuation of International Patent Application No. PCT/CN2014/083156, filed on Jul. 28, 2014, which claims priority to Chinese Patent Application No. 201310321264.2, filed on Jul. 26, 2013, both of which are hereby incorporated by reference in their entireties.

TECHNICAL FIELD

Embodiments of the present application relate to the field of antenna control technologies, and in particular, to an antenna array control apparatus, method, and system.

BACKGROUND

An antenna is a conversion device of an electrical signal and an electromagnetic signal, and performance of the antenna is of great importance in mobile communications. An important antenna indicator that affects performance of wireless communications is a tilt angle at which the antenna sends a signal, where a different tilt angle is corresponding to a different application scenario.

A remote electrical tilt antenna RCU (remote control unit) is a core component for adjusting a tilt angle of the antenna and performing remote real-time monitoring on a status of the antenna. In a multiband antenna, an RCU is generally built into the antenna and is connected to an RU (radio unit) device by using an AISG (Antenna Interface Standards Group) interface, and all antenna arrays can be controlled by using the RU device.

In an existing antenna control manner, connection lines between the antenna and the RU device can be reduced. However, in this antenna control manner, tilt angles of all the antenna arrays can be controlled only by one RU device. When the RU device is faulty or under corrective maintenance, it will cause that the RU device cannot control the antenna arrays. In another aspect, when multiple ports are needed in a network deployment to control an antenna array, the control cannot be implemented by using the existing antenna control manner.

SUMMARY

In view of this, embodiments of the present application provide an antenna array control apparatus, method, and system, so as to implement more flexible control ports of multiple antenna arrays.

To achieve the foregoing objective, the embodiments of the present application provide the following technical solutions.

According to a first aspect, the embodiments of the present application provide an antenna array control apparatus, configured to control work of an electric motor of multiple antenna arrays. The apparatus includes:

a link establishing unit, multiple modems, and multiple Antenna Interface Standards Group AISG interfaces, where:

each AISG interface is connected to one of the modems, and the AISG interfaces are in a one-to-one correspondence with the modems, where the AISG interfaces are configured to receive an antenna array configuration signal;

the multiple modems are connected to the link establishing unit, where the modems are configured to decode the antenna array configuration signal to obtain an antenna array configuration instruction; and the link establishing unit is connected to multiple electric motors and configured to establish a communications link between each electric motor and one of the modems according to the antenna array configuration instruction.

In an implementation manner of the first aspect of the embodiments of the present application, each electric motor has one unique identification identifier, the antenna array configuration instruction includes identification identifiers of multiple target electric motors, and a quantity of the target electric motors is less than or equal to a quantity of the electric motors of the multiple antenna arrays; and the link establishing unit includes:

a configuring unit, configured to establish a many-to-one correspondence between the multiple target electric motors and one of the modems according to the antenna array configuration instruction; or establish a one-to-one correspondence between the multiple target electric motors and the multiple modems according to the antenna array configuration instruction; or establish a many-to-one correspondence between some target electric motors in the multiple target electric motors and some modems in the multiple modems, and establish a one-to-one correspondence between the other target electric motors in the multiple target electric motors and the other modems in the multiple modems, according to the antenna array configuration instruction; and a link establishing subunit, configured to establish a communications link between the target electric motors and the modems according to the many-to-one or one-to-one correspondence.

In another implementation manner of the first aspect of the embodiments of the present application, the link establishing unit further includes:

a link detecting unit, configured to detect, before the configuring unit establishes the correspondence, whether a communications link exists between the target electric motors and one of the modems; and a link disconnecting unit, configured to: when a detection result of the detecting unit is that a communications link exists, disconnect the existing communications link of the target electric motors.

According to a second aspect, the embodiments of the present application disclose an antenna array control method, including:

receiving an antenna array configuration signal;

decoding the antenna array configuration signal to obtain an antenna array configuration instruction; and establishing a communications link between each electric motor and one of modems according to the antenna array configuration instruction.

In an implementation manner of the second aspect of the embodiments of the present application, each electric motor has one unique identification identifier, the antenna array configuration instruction includes identification identifiers of multiple target electric motors, and a quantity of the target electric motors is less than or equal to a quantity of electric motors of multiple antenna arrays; and the establishing a communications link between each electric motor and one of modems according to the antenna array configuration instruction includes:

establishing a many-to-one correspondence between the multiple target electric motors and one of the modems according to the antenna array configuration instruction; and establishing a many-to-one communications link between the multiple target electric motors and one of the modems according to the many-to-one correspondence.

In another implementation manner of the second aspect of the embodiments of the present application, the establishing a communications link between each electric motor and one of modems according to the antenna array configuration instruction includes:

establishing a one-to-one correspondence between the multiple target electric motors and multiple modems according to the antenna array configuration instruction; and establishing a one-to-one communications link between the multiple target electric motors and the multiple modems according to the one-to-one correspondence.

In still another implementation manner of the second aspect of the embodiments of the present application, the establishing a communications link between each electric motor and one of modems according to the antenna array configuration instruction includes:

establishing a many-to-one correspondence between some target electric motors in the multiple target electric motors and some modems in multiple modems, and establishing a one-to-one correspondence between the other target electric motors in the multiple target electric motors and the other modems in the multiple modems, according to the antenna array configuration instruction; and establishing a many-to-one communications link between the some target electric motors in the multiple target electric motors and the some modems in the multiple modems according to the many-to-one correspondence, and establishing a one-to-one communications link between the other target electric motors in the multiple target electric motors and the other modems in the multiple modems according to the one-to-one correspondence.

In still another implementation manner of the second aspect of the embodiments of the present application, before the correspondence is established between the target electric motors and the modems, the establishing a communications link between each electric motor and one of modems according to the antenna array configuration instruction further includes:

detecting whether a communications link exists between the target electric motors and one of the modems; and when a detection result is that a communications link exists, disconnecting the existing communications link of the target electric motors.

According to a third aspect, the embodiments of the present application disclose an antenna array control system, configured to control work of an electric motor of multiple antenna arrays. The system includes a configuration signal generating unit and an antenna array control apparatus, where:

the configuration signal generating unit is configured to generate an antenna array configuration signal; and the antenna array control apparatus includes:

one or more Antenna Interface Standards Group AISG interfaces configured to receive the antenna array configuration signal;

modems that are connected to the AISG interfaces, where the modems are configured to decode the antenna array configuration signal to obtain an antenna array configuration instruction, where each AISG interface is connected to one of the modems and the AISG interfaces are in a one-to-one correspondence with the modems; and a link establishing unit that is connected to each modem and connected to each electric motor, where the link establishing unit is configured to establish a communications link between each electric motor and one of the modems according to the antenna array configuration instruction.

In an implementation manner of the third aspect of the embodiments of the present application, the system further includes:

a control signal generating unit that is connected to the AISG interfaces, where the control signal generating unit is configured to generate a tilt angle control signal for the multiple antenna arrays and send the tilt angle control signal to the electric motor of the multiple antenna arrays by using the communications link established by the antenna array control apparatus.

It can be seen from the foregoing technical solutions that the embodiments of the present application provide an antenna array control apparatus, method, and system, multiple AISG interfaces are disposed, and a link establishing unit can establish a communications link between multiple electric motors and multiple modems according to a received antenna array configuration signal, that is, a communications link can be established between the multiple electric motors and the multiple AISG interfaces.

Therefore, when the antenna array control apparatus is used to control an antenna array, the multiple AISG interfaces can be used as control ports, and a communications link between the antenna array and the multiple AISG interfaces can be connected in multiple manners, so that multiple antenna arrays are more flexibly controlled.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make a person skilled in the art understand the technical solutions in the present application better, the following clearly and describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Embodiment 1

Figure 1:
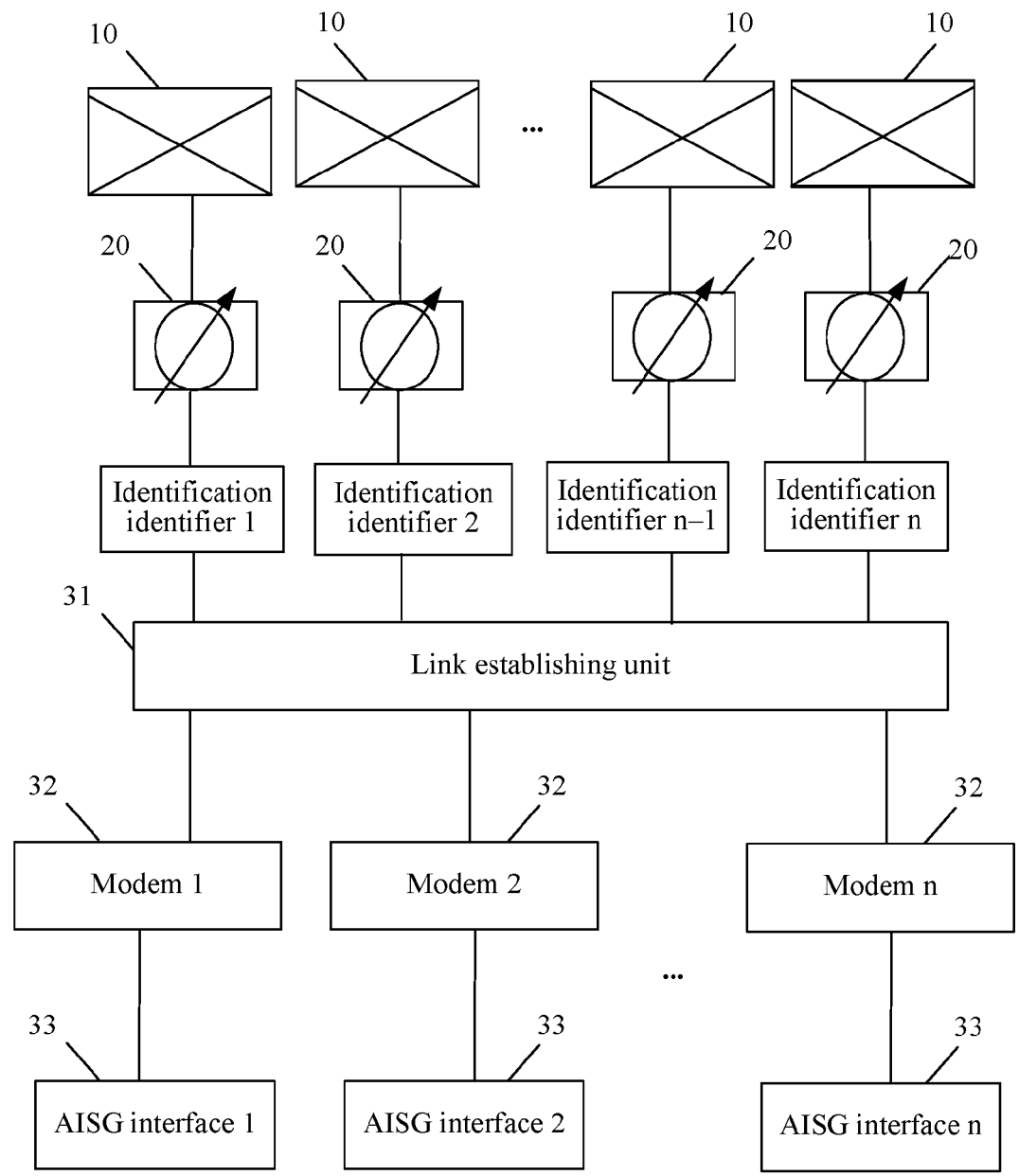
FIG. 1 is a schematic structural diagram of an antenna array control apparatus according to an embodiment of the present application.

FIG. 1 is a schematic structural diagram of an antenna array control apparatus according to an embodiment of the present application.

In this figure, 10 represents an antenna array, and 20 represents an electric motor connected to an antenna array. In addition, in FIG. 1, a quantity of antenna arrays 10 and a quantity of electric motors 20 are both n. Each antenna array 10 is separately connected to one electric motor 20. A tilt angle of the antenna array 10 connected to the electric motor 20 can be controlled by controlling work of the electric motor 20.

As shown in FIG. 1, the antenna array control apparatus includes: a link establishing unit 31, multiple modems 32, and multiple AISG (Antenna Interface Standards Group) interfaces 33, where each AISG interface 33 is connected to the link establishing unit 31 by using one modem 32, and the link establishing unit 31 is separately connected to multiple electric motors 20. In this embodiment of the present application, two electric motors 20 are used as an example to describe the antenna array control apparatus provided in this embodiment of the present application.

Each AISG interface 33 can be used as a control port and connected to an external control device or an antenna transceiver device. In one aspect, the AISG interface 33 can receive an antenna array configuration signal so as to control the tilt angle of the antenna array. In another aspect, the AISG interface 33 can also collect a signal received by an antenna and send a to-be-sent signal to the antenna so as to send the signal externally.

As shown in FIG. 1, each AISG interface 33 is connected to one modem 32; in this embodiment of the present application, each AISG interface 33 is in a one-to-one correspondence with the modem 32. When an AISG interface 33 of a modem 32 is used as a control port, the modem 32 not only is configured to decode an antenna array configuration signal received by the AISG interface 33 to obtain an antenna array configuration instruction but also can modulate a to-be-sent signal that is to be sent to an antenna and demodulate a signal received by an antenna.

In addition, in another embodiment of the present application, it may not need to decode the configuration signal, that is, the AISG interface 33 can directly receive the antenna array configuration instruction, and the configuration instruction is directly forwarded by using the modem 32.

One end of the link establishing unit 31 is separately connected to the multiple modems 32, and the other end of the link establishing unit 31 is separately connected to the multiple electric motors 20. The antenna array configuration instruction that is obtained by decoding of the modem 32 is sent to the link establishing unit 31. The link establishing unit 31 establishes a communications link between the multiple electric motors 20 and the multiple modems 32, and establishes a communications link between each electric motor 20 and one modem 32, according to the received antenna array configuration instruction.

It can be seen from the foregoing technical solution that: in the antenna array control apparatus provided in this embodiment of the present application, multiple AISG interfaces are disposed, and a link establishing unit can establish a communications link between multiple electric motors and multiple modems according to a received antenna array configuration signal, that is, a communications link can be established between the multiple electric motors and the multiple AISG interfaces.

Therefore, it can be seen that when the antenna array control apparatus is used to control an antenna array, the multiple AISG interfaces can be used as control ports, and a communications link between the antenna array and the multiple AISG interfaces can be connected in multiple manners, so that multiple antenna arrays are more flexibly controlled.

Embodiment 2

As shown in FIG. 1, in this embodiment of the present application, each electric motor 20 has one unique identification identifier, for example, 1, 2, 3, . . . , n−1, or n. In another embodiment of the present application, an identification identifier may also be in another form, for example, a two-dimensional barcode or an English letter. In addition, the identification identifier may also include information such as a type of an antenna array and a parameter of the antenna array.

In addition, considering that some antenna arrays can be selected to be controlled when multiple antenna arrays are controlled, an antenna array configuration instruction received by an AISG interface includes identification identifiers of multiple target electric motors, where the target electric motors refer to electric motors corresponding to the antenna arrays that need to be controlled, and a quantity of the target electric motors is less than or equal to a quantity of electric motors 20 (that is, all the electric motors) of the multiple antenna arrays.

Figure 2:
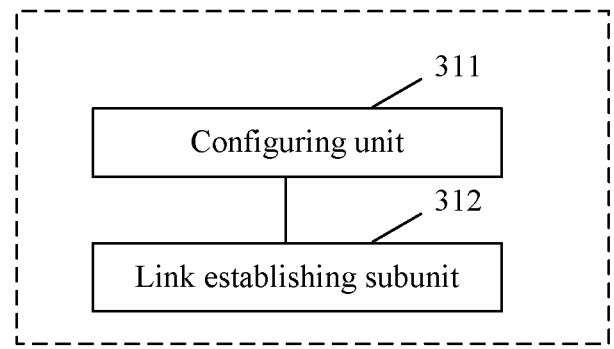
FIG. 2 is a schematic structural diagram of a link establishing unit according to an embodiment of the present application.

To implement establishment of a communications link between multiple AISG interfaces 33 and the multiple target electric motors, as shown in FIG. 2, a link establishing unit 31 may include the following parts: a configuring unit 311 and a link establishing subunit 312.

A function of the configuring unit 311 is to establish a mapping relationship between a target electric motor and a modem. The configuring unit 311 receives an antenna array configuration instruction sent by a modem 32, and according to the antenna array configuration instruction, establishes a many-to-one correspondence between the multiple target electric motors and one modem 32, or establishes a one-to-one correspondence between the multiple target electric motors and multiple modems 32.

The correspondence configured by the configuring unit 311 ensures that a correspondence is established between each target electric motor and one modem 32.

The link establishing subunit 312 is connected to the configuring unit 311, receives the correspondence established by the configuring unit 311, and establishes a communications link between the target electric motors and the modems 32 according to the received correspondence.

Figure 3:
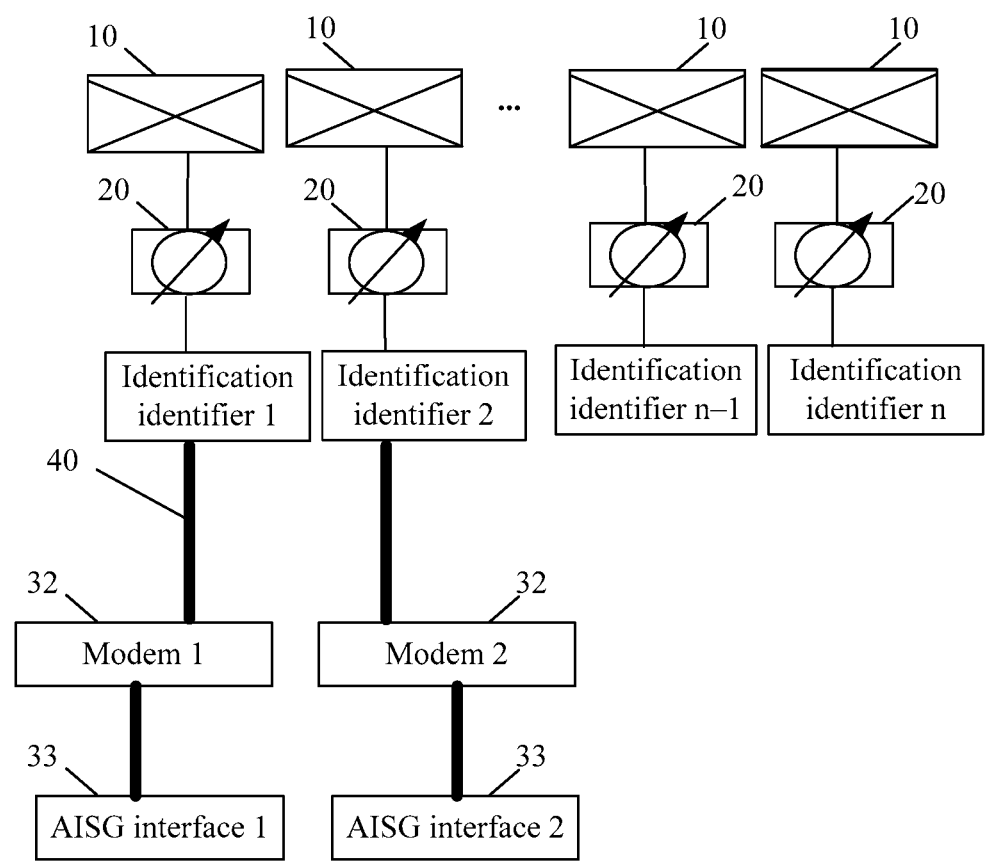
FIG. 3 is a schematic diagram of a communications link according to an embodiment of the present application.

When the received correspondence is a one-to-one correspondence, a one-to-one communications link needs to be established between the multiple target electric motors and the multiple modems 32. As shown in FIG. 3, in this figure, there are two target electric motors. In this figure, it can be seen that a communications link 40 (a thick line in this figure represents a communications link) is separately established between one electric motor and one modem, so that two different AISG interfaces can be both used as control ports to separately control two antenna arrays.

Figure 4:
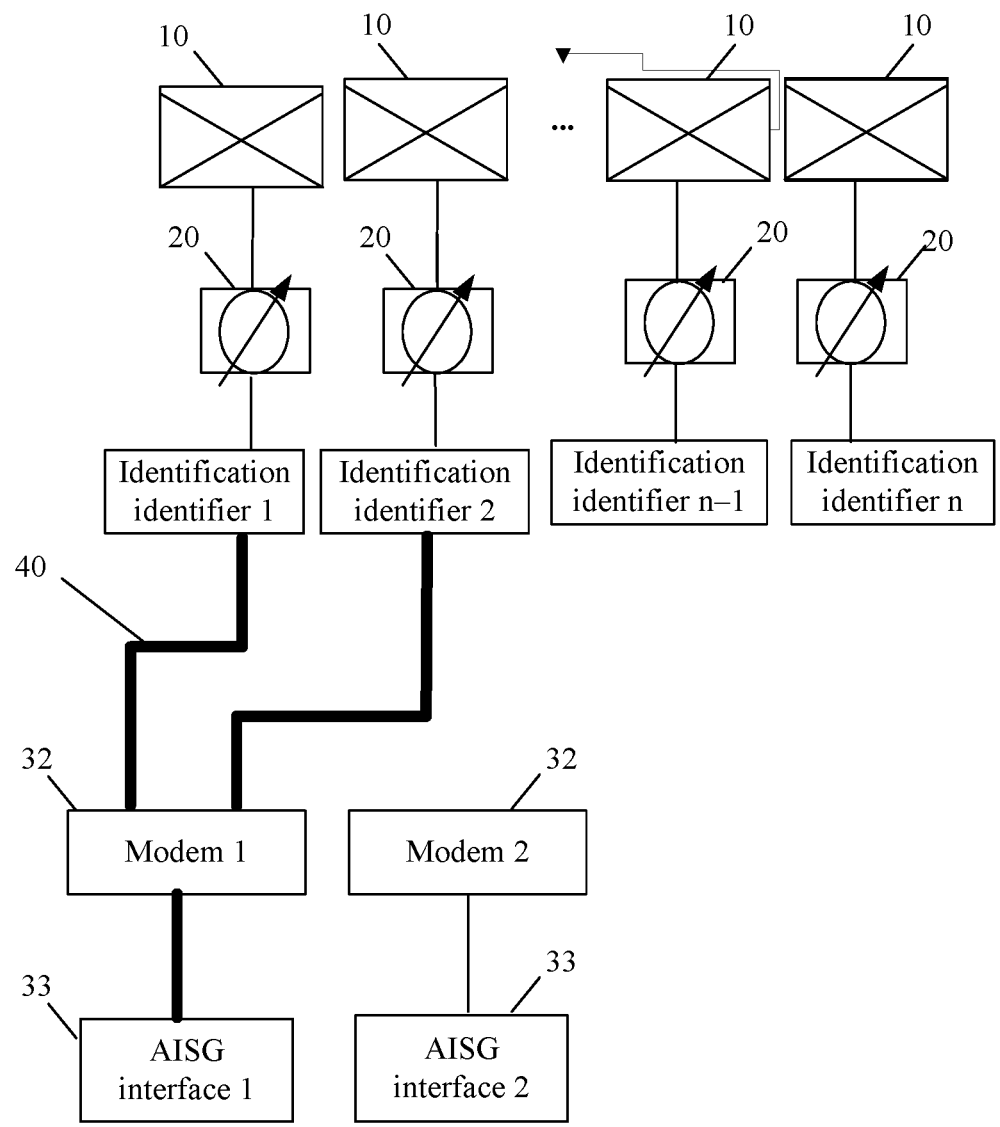
FIG. 4 is a schematic diagram of another communications link according to an embodiment of the present application.
Figure 5:
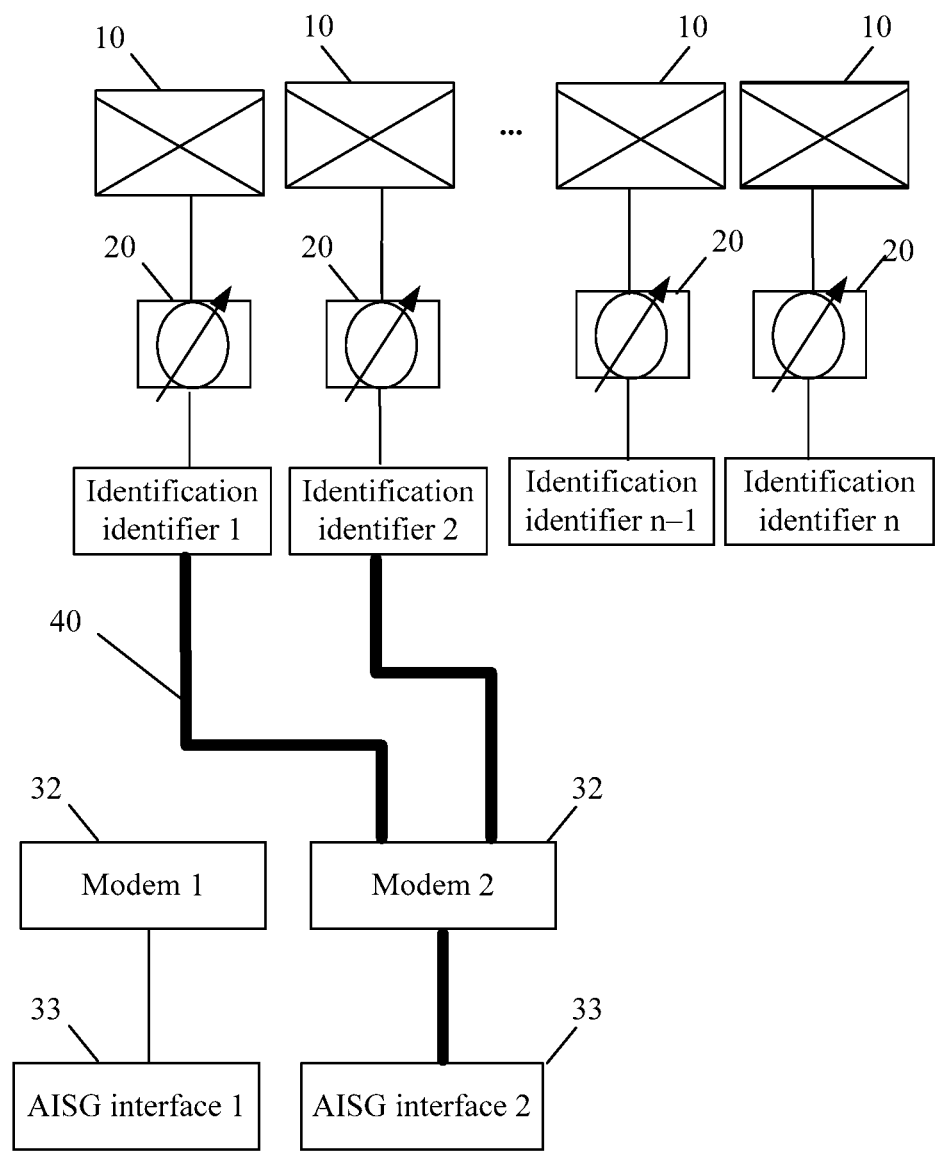
FIG. 5 is a schematic diagram of still another communications link according to an embodiment of the present application.

If the received correspondence is a many-to-one correspondence, the link establishing subunit 312 establishes a communications link between the multiple target electric motors and one modem 32. As shown in FIG. 4 and FIG. 5, in these figures, a quantity of the target electric motors is also two. It can be seen from the figures that a communications link 40 (a thick line in the figures represents a communications link) is established between the two target electric motors and one same AISG interface, so that one AISG interface can be used as a control port to simultaneously control two antenna arrays.

Figure 6:
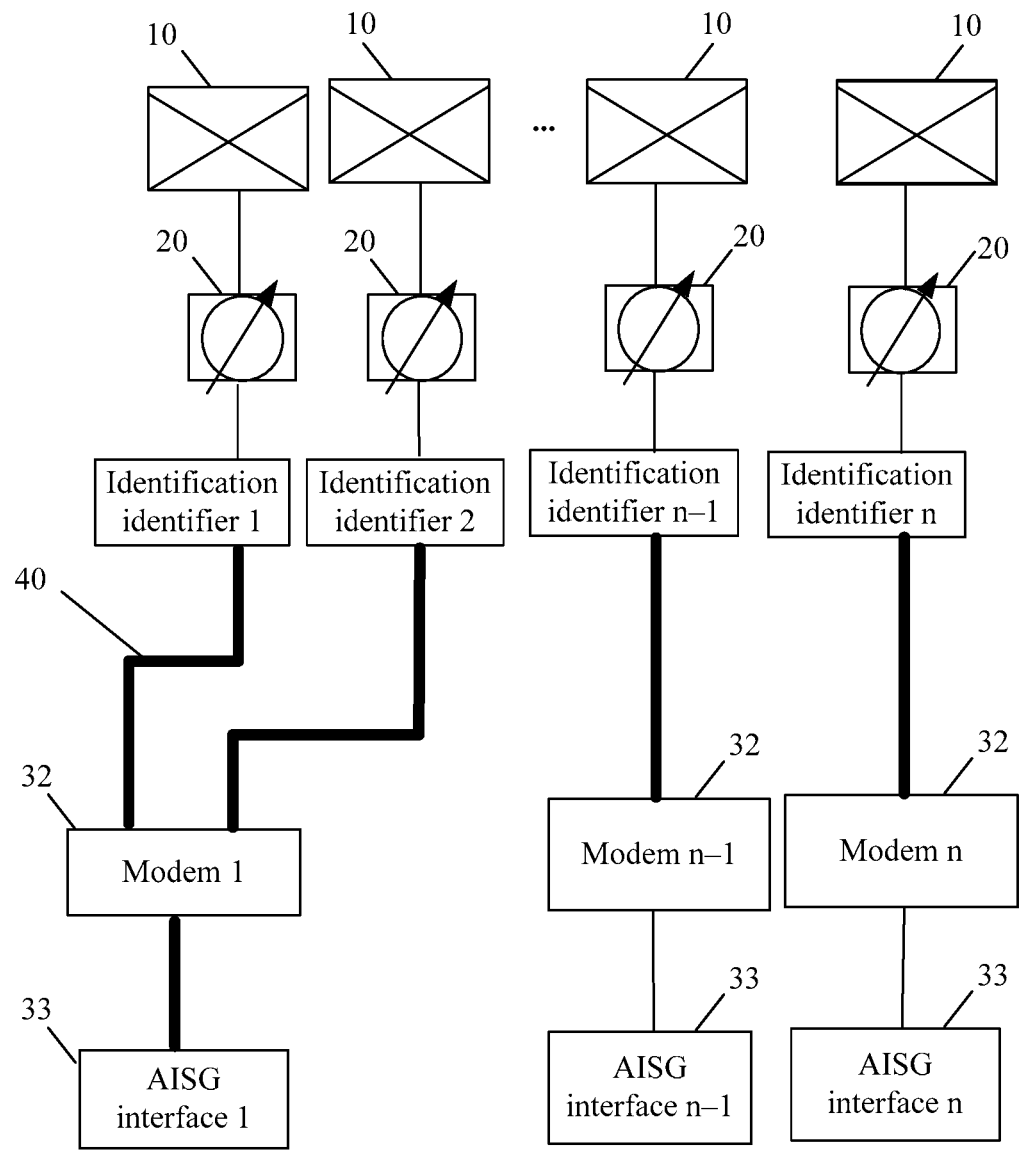
FIG. 6 is a schematic diagram of still another communications link according to an embodiment of the present application.

In addition, when a communications link is established, two correspondences can be both configured for multiple target electric motors. As shown in FIG. 6, for some of the multiple target electric motors, a configured correspondence may be a one-to-one correspondence, while for the others of the multiple target electric motors, a configured correspondence may be a many-to-one correspondence. Herein, in a specific application, dividing the multiple target electric motors into two parts can be flexibly set according to a requirement. In addition, although the two correspondences are both configured, it must be ensured that a communications link is established between one target electric motor and only one modem.

In this embodiment of the present application, the link establishing unit 31 may be a chip of a single-chip microcomputer or a microprocessor chip.

It can be seen from the foregoing technical solution that a configuring unit can establish a many-to-one correspondence between multiple target electric motors and one of modems, or establish a one-to-one correspondence between multiple target electric motors and multiple modems according to an antenna array configuration instruction. Then a link establishing subunit establishes a communications link between the target electric motors and the modems according to the established correspondence, and it can be ensured that a communications link is established between each electric motor and one of the modems.

Embodiment 3

In actual use, control on an antenna array is not unchangeable. When a fault occurs in the antenna array or multiple ports are needed in a network deployment to control the antenna array, a control solution of the antenna array needs to be adjusted. However, for an electric motor of the antenna array, two communications links are not allowed to be simultaneously established for one electric motor, so as to prevent an occurrence of a case of a control disorder.

Figure 7:
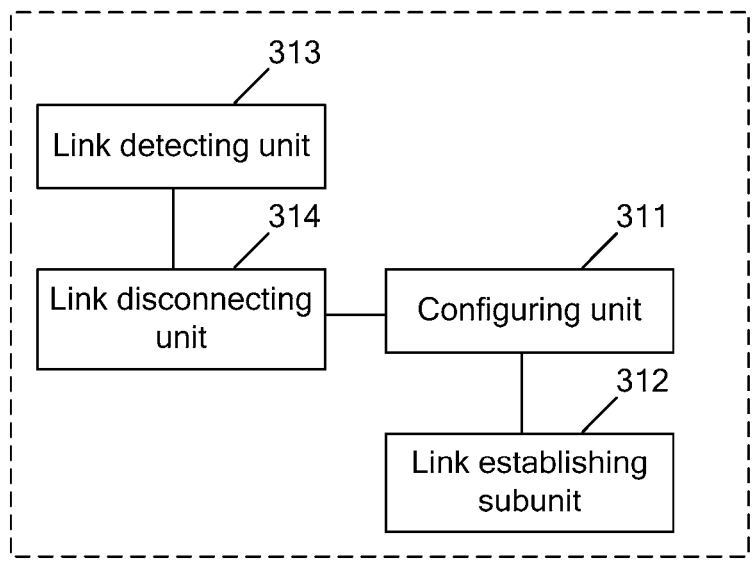
FIG. 7 is another schematic structural diagram of a link establishing unit according to an embodiment of the present application.

Therefore, as shown in FIG. 7, a link establishing unit provided in this embodiment of the present application may also include the following parts: a link detecting unit 300 and a link disconnecting unit 314.

Before a configuring unit establishes a correspondence, the link detecting unit 300 can detect a communications link of target electric motors, that is, detect whether a communications link exists between the target electric motors and one modem 32.

The link disconnecting unit 314 is connected to the link detecting unit 300. When a detection result of the link detecting unit 300 is that a communications link exists, the link disconnecting unit 314 disconnects the existing communications link of the target electric motors.

In this embodiment of the present application, when a communications link needs to be updated, a rule of "one established first is effective, while one established later is ineffective" is followed. That is, for a same electric motor, when a communications link has been established, communications links that are established later are ineffective. Therefore, before the configuring unit establishes the correspondence, the link detecting unit 300 needs to detect whether the target electric motors have a communications link; when a communications link exists, the link disconnecting unit disconnects the existing communications link, so as to ensure that the existing communications link of the target electric motors is disconnected before each communications link is established.

In another embodiment of the present application, when a communications link needs to be updated, another manner can also be used, for example, one established later is effective. Therefore, neither the link detecting unit 300 nor the link disconnecting unit 314 needs to be disposed; every time the configuring unit configures a new correspondence, the link establishing unit only needs to establish a new communications link to complete an update process of the communications link.

In addition, in another solution, priorities can be set for an existing communications link and a newly established communications link. That is, if a preset condition is met, the newly established communications link is used as an effective communications link; and if the preset condition is not met, the existing communications link is used as an effective communications link, where the preset condition may be establishment time of the existing communications link, a use condition of the existing communications link, or the like.

Embodiment 4

Figure 8:
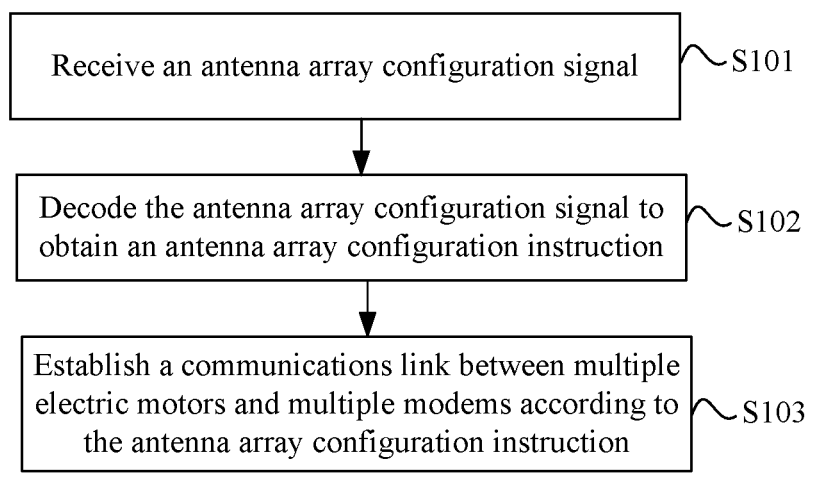
FIG. 8 is a schematic flowchart of an antenna array control method according to an embodiment of the present application.

FIG. 8 is a schematic flowchart of an antenna array control method according to an embodiment of the present application.

As shown in FIG. 8, the antenna array control method includes the following steps:

S101. Receive an antenna array configuration signal.

FIG. 1 is a diagram of an apparatus in the antenna array control method according to an embodiment of the present application. It can be seen from FIG. 1 that in this embodiment of the present application, an AISG interface can be used as a control port, and the AISG interface is used to receive the antenna array configuration signal so as to control a tilt angle of an antenna array.

S102. Decode the antenna array configuration signal to obtain an antenna array configuration instruction.

In this embodiment of the present application, as shown in FIG. 1, the antenna array configuration instruction is obtained after a modem is used to decode the received antenna array configuration signal.

In addition, in another embodiment of the present application, the antenna array configuration instruction can be directly received without a need to decode the configuration signal.

S103. Establish a communications link between multiple electric motors and multiple modems according to the antenna array configuration instruction.

After the communications link is established, a communications link is established between each electric motor and one modem.

After the communications link is established, the AISG interface can be used to receive a control instruction of the antenna array, and sends the control instruction to a corresponding electric motor of the antenna array by using an established communications link, so as to complete control on the tilt angle of the antenna array.

It can be seen from the foregoing technical solution that: in the antenna array method provided in this embodiment of the present application, according to a received antenna array configuration signal, a communications link can be established between multiple electric motors and multiple modems, that is, a communications link is established between the multiple electric motors and multiple AISG interfaces that are used as control ports. Therefore, when the antenna array control method is used to control an antenna array, the multiple AISG interfaces can be simultaneously used as the control ports, and a communications link between the antenna array and the multiple AISG interfaces that are used as the control ports can be connected in multiple manners, so that multiple antenna arrays are more flexibly controlled.

Embodiment 5

Figure 9:
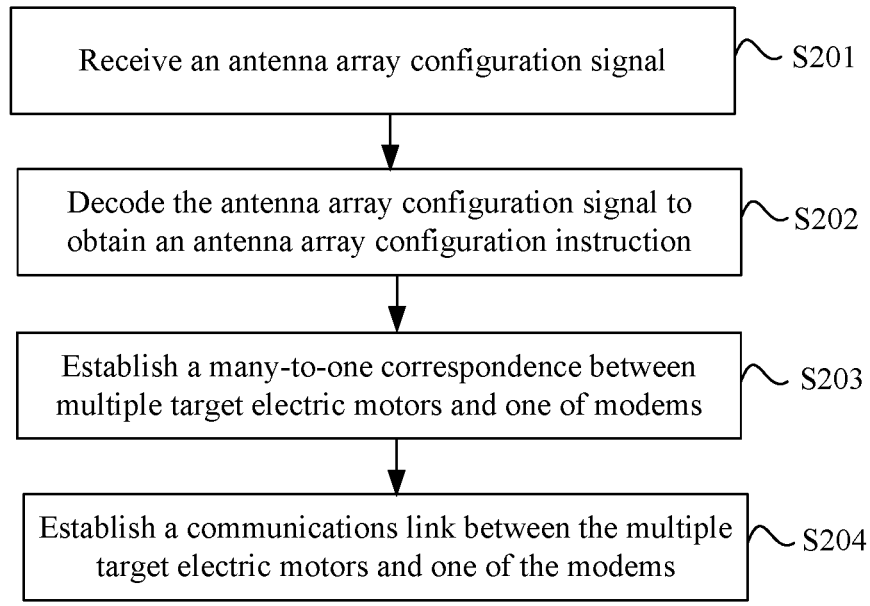
FIG. 9 is a schematic flowchart of another antenna array control method according to an embodiment of the present application.

FIG. 9 is a schematic flowchart of another antenna array control method according to an embodiment of the present application.

In this embodiment of the present application, each electric motor has one unique identification identifier, an antenna array configuration instruction includes identification identifiers of multiple target electric motors, and a quantity of the target electric motors is less than or equal to a quantity of electric motors of multiple antenna arrays.

As shown in FIG. 9, the antenna array control method includes the following steps:

S201. Receive an antenna array configuration signal.

S202. Decode the antenna array configuration signal to obtain an antenna array configuration instruction.

S203. Establish a many-to-one correspondence between the multiple target electric motors and one of modems according to the antenna array configuration instruction.

S204. Establish a communications link between the multiple target electric motors and one of the modems according to the many-to-one correspondence.

As shown in FIG. 3, in this figure, there are two target electric motors. It can be seen from the figure that a communications link 40 (a thick line in the figure represents a communications link) is separately established between one electric motor and one modem, so that two different AISG interfaces can be both used as control ports to separately control two antenna arrays.

Embodiment 6

Figure 10:
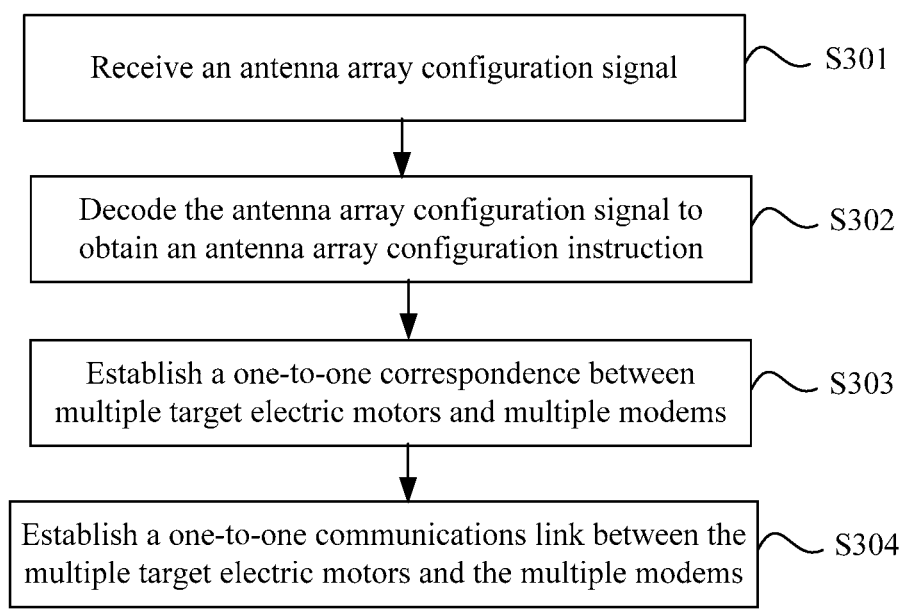
FIG. 10 is a schematic flowchart of still another antenna array control method according to an embodiment of the present application.

FIG. 10 is a schematic flowchart of still another antenna array control method according to an embodiment of the present application.

In this embodiment of the present application, each electric motor has one unique identification identifier, an antenna array configuration instruction includes identification identifiers of multiple target electric motors, and a quantity of the target electric motors is less than or equal to a quantity of electric motors of multiple antenna arrays.

As shown in FIG. 10, the antenna array control method includes the following steps:

S301. Receive an antenna array configuration signal.

S302. Decode the antenna array configuration signal to obtain an antenna array configuration instruction.

S303. Establish a one-to-one correspondence between the multiple target electric motors and multiple modems according to the antenna array configuration instruction.

S304: Establish a one-to-one communications link between the multiple target electric motors and the multiple modems according to the one-to-one correspondence.

As shown in FIG. 4 and FIG. 5, in these figures, there are also two target electric motors. It can be seen from the figures that a communications link 40 (a thick line in the figures represents a communications link) is established between the two target electric motors and a same AISG interface, so that one AISG interface can be used as a control port to simultaneously control two antenna arrays.

Embodiment 7

Figure 11:
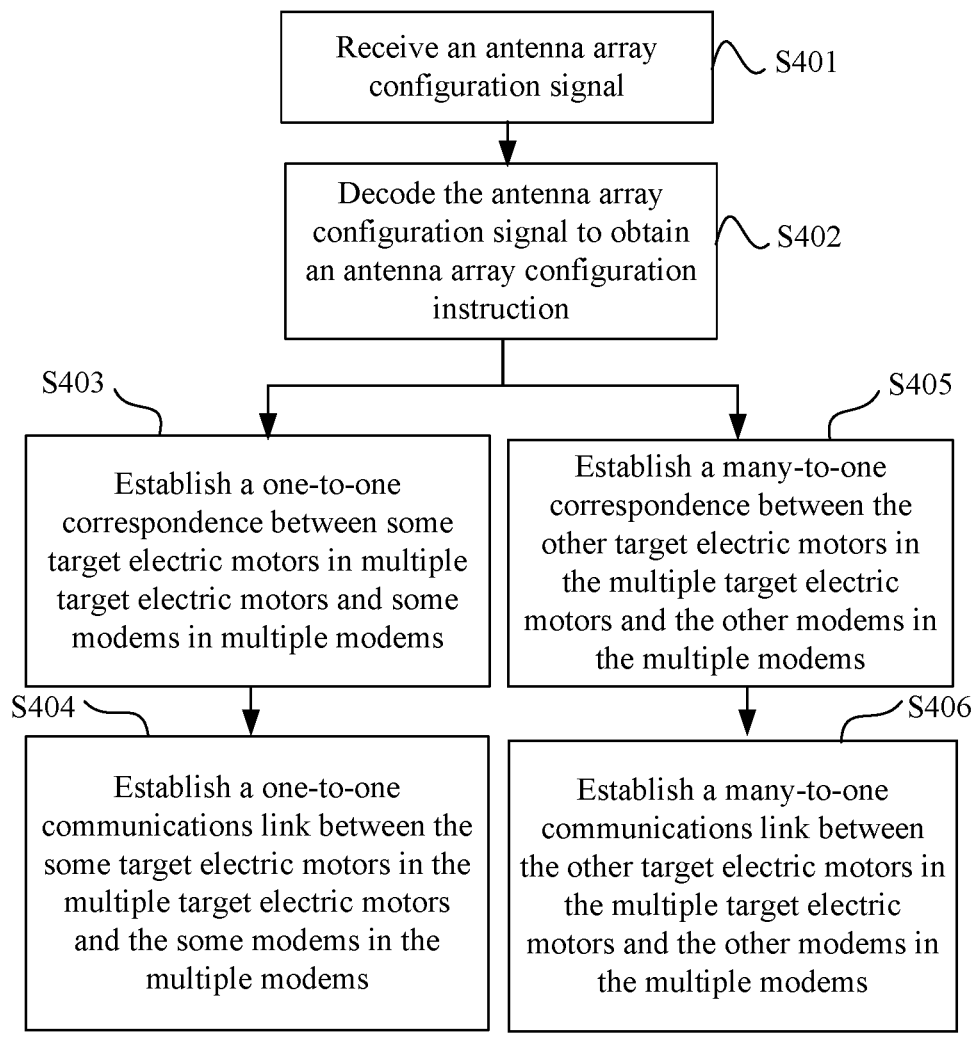
FIG. 11 is a schematic flowchart of still another antenna array control method according to an embodiment of the present application.

FIG. 11 is a schematic flowchart of still another antenna array control method according to an embodiment of the present application.

In this embodiment of the present application, each electric motor has one unique identification identifier, an antenna array configuration instruction includes identification identifiers of multiple target electric motors, and a quantity of the target electric motors is less than or equal to a quantity of electric motors of multiple antenna arrays.

As shown in FIG. 11, the antenna array control method includes the following steps:

S401. Receive an antenna array configuration signal.

S402. Decode the antenna array configuration signal to obtain an antenna array configuration instruction.

S403. Establish a one-to-one correspondence between a part of target electric motors in the multiple target electric motors and another part of modems in multiple modems according to the antenna array configuration instruction.

S404. Establish a one-to-one communications link between the some target electric motors in the multiple target electric motors and the some modems in the multiple modems according to the one-to-one correspondence.

S405. Establish a many-to-one correspondence between the other target electric motors in the multiple target electric motors and the other modems in the modems according to the antenna array configuration instruction.

S406. Establish a communications link between the other target electric motors in the multiple target electric motors and the other modems in the modems according to the many-to-one correspondence.

When the communications link is established, two correspondences can be both configured for the multiple target electric motors. As shown in FIG. 6, for some of the multiple target electric motors, a configured correspondence may be a one-to-one correspondence, while for the others of the multiple target electric motors, a configured correspondence may be a many-to-one correspondence. Herein, in a specific application, dividing the multiple target electric motors into two parts can be flexibly set according to a requirement. In addition, although the two correspondences are both configured, it must be ensured that a communications link is established between each target electric motor and one modem.

Embodiment 8

In actual use, control on an antenna array is not unchangeable. When a fault occurs in the antenna array or multiple ports are needed in a network deployment to control the antenna array, a control solution of the antenna array needs to be adjusted. However, for an electric motor of the antenna array, two communications links are not allowed to be simultaneously established for one electric motor, so as to prevent an occurrence of a case of a control disorder.

Figure 12:
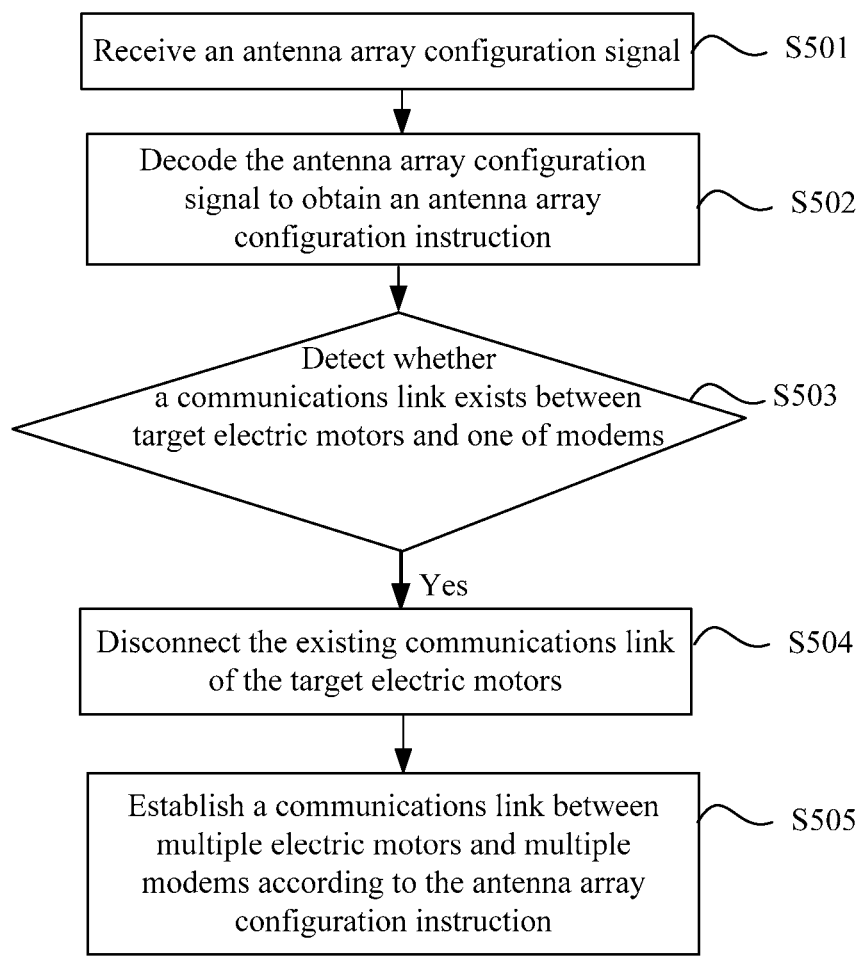
FIG. 12 is a schematic flowchart of still another antenna array control method according to an embodiment of the present application.

Therefore, as shown in FIG. 12, FIG. 12 is a schematic flowchart of still another antenna array control method according to an embodiment of the present application, and the antenna array control method includes the following steps:

S501. Receive an antenna array configuration signal.

S502. Decode the antenna array configuration signal to obtain an antenna array configuration instruction.

S503: Detect whether a communications link exists between target electric motors and one of modems.

S504. When a detection result is that a communications link exists, disconnect the existing communications link of the target electric motors.

In this embodiment of the present application, when a communications link needs to be updated, a rule of "one established first is effective, while one established later is ineffective" is followed. That is, for a same electric motor, when a communications link has been established, communications links that are established later are ineffective. Therefore, before a correspondence is established, whether the target electric motors have a communications link needs to be detected; when a communications link exists, the existing communications link is disconnected, so as to ensure that the existing communications link of the target electric motors is disconnected before each communications link is established.

S505. Establish a communications link between multiple electric motors and multiple modems according to the antenna array configuration instruction.

In another embodiment of the present application, when a communications link needs to be updated, another manner can also be used, for example, one established later is effective. Therefore, there is no need to detect an existing communications link and disconnect the existing communications link; every time a new correspondence is configured, it only needs to establish a new communications link to complete an update process of the communications link.

In addition, in another solution, priorities can be set for an existing communications link and a newly established communications link. That is, if a preset condition is met, the newly established communications link is used as an effective communications link; and if the preset condition is not met, the existing communications link is used as an effective communications link, where the preset condition may be establishment time of the existing communications link, a use condition of the existing communications link, or the like.

In addition, in this embodiment of the present application, before step S501, the method may further include:

S506. Scan and acquire identification identifiers of multiple electric motors.

Herein, electric motors 20 of multiple antenna arrays 10 can be scanned in a system initialization process, so as to confirm the identification identifiers and a quantity that are of the electric motors 20 corresponding to the antenna arrays 10. It can be seen from this perspective that a quantity of the target electric motors should be less than the quantity of the electric motors corresponding to the acquired identification identifiers.

In addition, in another embodiment of the present application, the identification identifiers that are of the multiple electric motors 20 and acquired by means of scanning can be output by using an AISG interface 33, so that an operator or a control system can generate an antenna array configuration signal according to the identification identifiers of the multiple electric motors 20.

Embodiment 9

Figure 13:
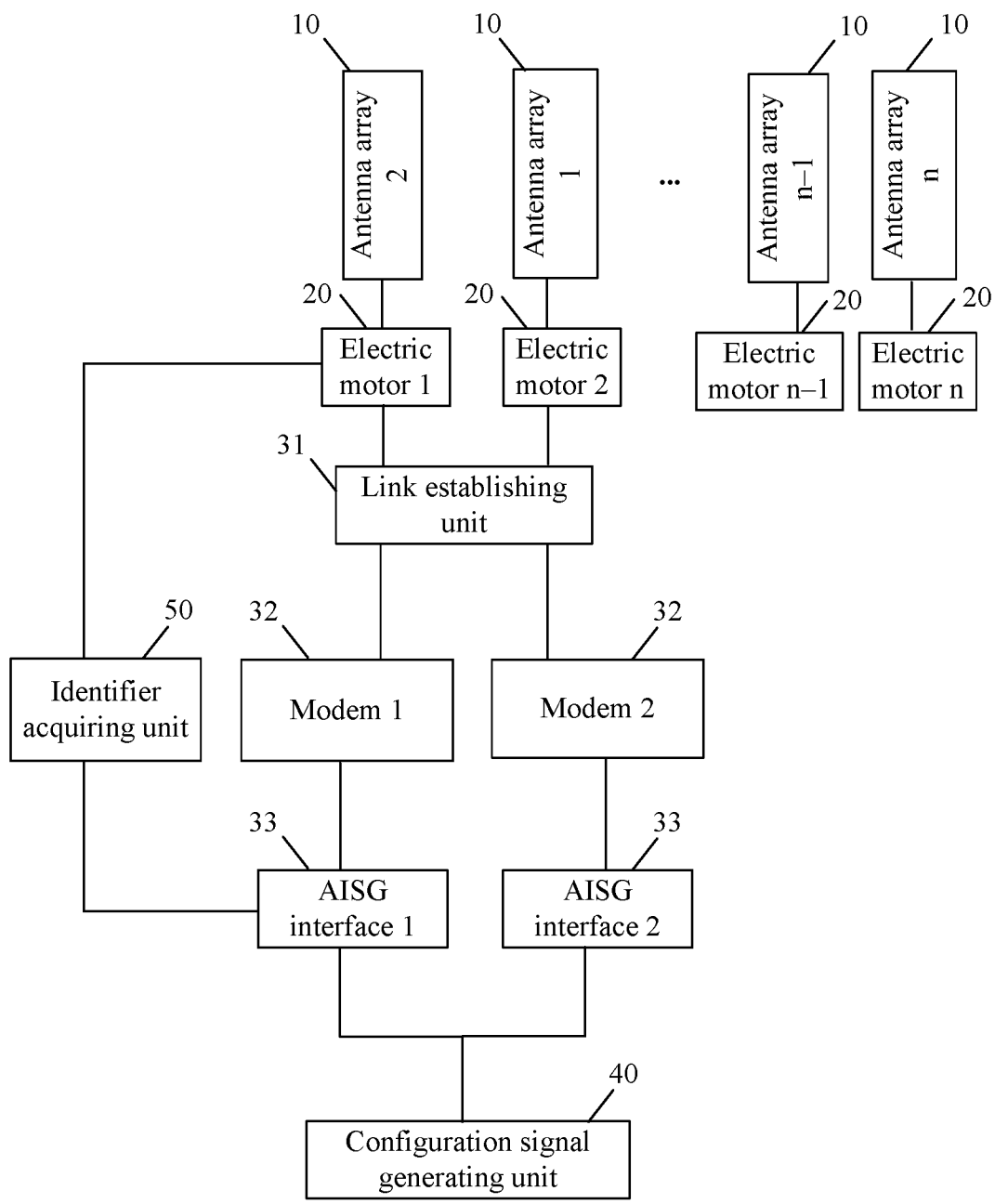
FIG. 13 is a schematic structural diagram of an antenna array control system according to an embodiment of the present application.

FIG. 13 is a schematic structural diagram of an antenna array control system according to an embodiment of the present application.

In this figure, 10 represents an antenna array, and 20 represents an electric motor connected to an antenna array. In addition, in FIG. 1, a quantity of antenna arrays 10 and a quantity of electric motors 20 are both n. Each antenna array 10 is separately connected to one electric motor 20. A tilt angle of the antenna array 10 connected to the electric motor 20 can be controlled by controlling work of the electric motor 20.

As shown in FIG. 13, the antenna array control system includes: a configuration signal generating unit 40 and an antenna array control apparatus.

The antenna array control apparatus includes: a link establishing unit 31, multiple modems 32, and multiple AISG interfaces 33, where each AISG interface 33 is connected to the link establishing unit 31 by using one modem 32, and the link establishing unit 31 is separately connected to multiple electric motors 20.

A connection relationship between each component of the antenna array control apparatus and a function of each component are described in detail in the foregoing Embodiment 1 to Embodiment 3. For details, reference may be made to content recorded in the foregoing Embodiment 1 to Embodiment 3, and details are not described herein again.

The configuration signal generating unit 40 is configured to generate an antenna array configuration signal, where the antenna array configuration signal may also include parameters such as a tilt angle parameter of an antenna array, and sent it to an electric motor of multiple antenna arrays by using a communications link established by the antenna array control apparatus, so as to implement control on an tilt angle of an antenna array. In this embodiment of the present application, the configuration signal generating unit 40 may be a control device connected to the antenna array control apparatus, or the like.

In addition, as shown in FIG. 13, the system may further include an identifier acquiring unit 50.

The identifier acquiring unit 50 is separately connected to the multiple electric motors 20 and separately connected to the multiple AISG interfaces (In FIG. 13, the identifier acquiring unit 50 is connected to only one electric motor and one AISG interface.) The identifier acquiring unit 50 is configured to scan and acquire identification identifiers of the multiple electric motors 20, and send, by using the AISG interfaces, the identification identifiers that are of the multiple electric motors and acquired by means of scanning to the configuration signal generating unit.

In this embodiment of the present application, the identifier acquiring unit 50 can scan the electric motors 20 of the multiple antenna arrays 10 in a system initialization process, so as to confirm the identification identifiers and a quantity that are of the electric motors 20 corresponding to the antenna arrays 10. It can be seen from this perspective that a quantity of target electric motors should be less than the quantity of the electric motors corresponding to the identification identifiers acquired by the identifier acquiring unit 50.

In addition, the identification identifiers that are of the multiple electric motors 20 and acquired by the identifier acquiring unit 50 by means of scanning can be output by using the AISG interfaces 33, so that an operator or a control system can generate an antenna array configuration signal according to the identification identifiers of the multiple electric motors 20.

It can be seen from the foregoing technical solution that: in the antenna array control system provided in this embodiment of the present application, multiple AISG interfaces are disposed, and a link establishing unit can establish a communications link between multiple electric motors and multiple modems according to a received antenna array configuration signal, that is, a communications link can be established between the multiple electric motors and the multiple AISG interfaces.

Therefore, it can be seen that when the antenna array control system is used to control an antenna array, the multiple AISG interfaces can be used as control ports, and a communications link between the antenna array and the multiple AISG interfaces can be connected in multiple manners, so that multiple antenna arrays are more flexibly controlled.

The embodiments in this specification are described in a progressive manner, for same or similar parts in the embodiments, reference may be made to these embodiments, and each embodiment focuses on a difference from other embodiments. Especially, apparatus or system embodiments are basically similar to a method embodiment, and therefore are described briefly; for related parts, reference may be made to partial descriptions in the method embodiment. The described apparatus and system embodiments are merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present application without creative efforts.

The present application may be applicable to environments or configurations of multiple universal or dedicated computing systems, for example, a personal computer, a server computer, a handheld device or a portable device, a flat panel device, a multi-processor system, a microprocessor-based system, a set-top box, a network PC, a minicomputer, a mainframe computer, and a distributed computing environment including any one of the foregoing system or device.

The present application can be described in the general context of executable computer instructions executed by a computer, for example, a program module. Generally, the program unit includes a routine, program, object, component, data structure, and the like for executing a particular task or implementing a particular abstract data type. The present application may also be practiced in distributed computing environments in which tasks are performed by remote processing devices that are connected by using a communications network. In a distributed computing environment, program modules may be located in both local and remote computer storage media including storage devices.

The foregoing descriptions are merely exemplary implementation manners of the present application for a person skilled in the art to understand or implement the present application. Various modifications to the embodiments are obvious to the person skilled in the art, and general principles defined in this specification may be implemented in other embodiments without departing from the spirit or scope of the present application. Therefore, the present application will not be limited to the embodiments described in this specification but extends to the widest scope that complies with the principles and novelty disclosed in this specification.

What is claimed is:

1. An antenna array control apparatus, configured to control work of an electric motor of multiple antenna arrays, wherein the apparatus comprises: a link establishing unit, multiple modems, and multiple Antenna Interface Standards Group (AISG) interfaces, wherein:
    each AISG interface is connected to one of the modems, and the AISG interfaces are in a one-to-one correspondence with the modems, wherein the AISG interfaces are configured to receive an antenna array configuration signal;
    the multiple modems are connected to the link establishing unit, the modems are configured to decode the antenna array configuration signal to obtain an antenna array configuration instruction; and
    the link establishing unit is connected to multiple electric motors and configured to establish a communications link between each electric motor and one of the modems according to the antenna array configuration instruction.

2. The apparatus according to claim 1, wherein each electric motor has one unique identification identifier, the antenna array configuration instruction comprises identification identifiers of multiple target electric motors, and a quantity of the target electric motors is less than or equal to a quantity of the electric motors of the multiple antenna arrays; and
    the link establishing unit comprises:
    a configuring unit, configured to establish a correspondence between the multiple target electric motors and the modems according to the antenna array configuration instruction, the correspondence includes one of the following types of correspondence:
    a many-to-one correspondence between the multiple target electric motors and one of the modems;
    a one-to-one correspondence between the multiple target electric motors and the multiple modems; and
    a many-to-one correspondence between some target electric motors in the multiple target electric motors and some modems in the multiple modems, and a one-to-one correspondence between the other target electric motors in the multiple target electric motors and the other modems in the multiple modems; and
    a link establishing subunit, configured to establish a communications link between the target electric motors and the modems according to the correspondence.

3. The apparatus according to claim 2, wherein the link establishing unit further comprises:
    a link detecting unit, configured to detect, before the configuring unit establishes the correspondence, whether a communications link exists between the target electric motors and one of the modems; and a link disconnecting unit, configured to: when a detection result of the detecting unit is that a communications link exists, disconnect the existing communications link of the target electric motors.

4. An antenna array control method, comprising:
receiving an antenna array configuration signal;
decoding the antenna array configuration signal to obtain an antenna array configuration instruction; and
establishing a communications link between each electric motor and one of modems according to the antenna array configuration instruction.

5. The method according to claim 4, wherein each electric motor has one unique identification identifier, the antenna array configuration instruction comprises identification identifiers of multiple target electric motors, and a quantity of the target electric motors is less than or equal to a quantity of electric motors of multiple antenna arrays; and
the establishing a communications link between each electric motor and one of modems according to the antenna array configuration instruction comprises:
establishing a many-to-one correspondence between the multiple target electric motors and one of the modems according to the antenna array configuration instruction; and
establishing a many-to-one communications link between the multiple target electric motors and one of the modems according to the many-to-one correspondence.

6. The method according to claim 4, wherein each electric motor has one unique identification identifier, the antenna array configuration instruction comprises identification identifiers of multiple target electric motors, and a quantity of the target electric motors is less than or equal to a quantity of electric motors of multiple antenna arrays; and
the establishing a communications link between each electric motor and one of modems according to the antenna array configuration instruction comprises:
establishing a one-to-one correspondence between the multiple target electric motors and multiple modems according to the antenna array configuration instruction; and
establishing a one-to-one communications link between the multiple target electric motors and the multiple modems according to the one-to-one correspondence.

7. The method according to claim 4, wherein each electric motor has one unique identification identifier, the antenna array configuration instruction comprises identification identifiers of multiple target electric motors, and a quantity of the target electric motors is less than or equal to a quantity of electric motors of multiple antenna arrays; and
the establishing a communications link between each electric motor and one of modems according to the antenna array configuration instruction comprises:
establishing a many-to-one correspondence between some target electric motors in the multiple target electric motors and some modems in multiple modems, and establishing a one-to-one correspondence between the other target electric motors in the multiple target electric motors and the other modems in the multiple modems, according to the antenna array configuration instruction; and
establishing a many-to-one communications link between the some target electric motors in the multiple target electric motors and the some modems in the multiple modems according to the many-to-one correspondence, and establishing a one-to-one communications link between the other target electric motors in the multiple target electric motors and the other modems in the multiple modems according to the one-to-one correspondence.

8. The method according to claim 4, wherein before the establishing a communications link between each electric motor and one of modems according to the antenna array configuration instruction, further comprises:
detecting whether a communications link exists between the target electric motors and one of the modems; and
when a detection result is that a communications link exists, disconnecting the existing communications link of the target electric motors.

9. The method according to claim 8, wherein before the receiving an antenna array configuration signal, the method further comprises:
scanning and acquiring identification identifiers of multiple electric motors.

10. An antenna array control system, configured to control work of an electric motor of multiple antenna arrays, wherein the system comprises a configuration signal generating unit and an antenna array control apparatus, wherein:
the configuration signal generating unit is configured to generate an antenna array configuration signal; and
the antenna array control apparatus comprises:
one or more Antenna Interface Standards Group AISG interfaces configured to receive the antenna array configuration signal;
modems that are connected to the AISG interfaces, wherein the modems are configured to decode the antenna array configuration signal to obtain an antenna array configuration instruction, wherein each AISG interface is connected to one of the modems and the AISG interfaces are in a one-to-one correspondence with the modems; and
a link establishing unit that is connected to each modem and connected to each electric motor, configured to establish a communications link between each electric motor and one of the modems according to the antenna array configuration instruction.

11. The system according to claim 10, wherein the system further comprises:
a control signal generating unit that is connected to the AISG interfaces, wherein the control signal generating unit is configured to generate a tilt angle control signal for the multiple antenna arrays and send the tilt angle control signal to the electric motor of the multiple antenna arrays by using the communications link established by the antenna array control apparatus.

12. The system according to claim 11, wherein each electric motor has one unique identification identifier, the antenna array configuration instruction comprises identification identifiers of multiple target electric motors, and a quantity of the target electric motors is less than or equal to a quantity of electric motors of the multiple antenna arrays; and
the link establishing unit comprises:
a configuring unit, configured to establish a correspondence between the multiple target electric motors and the modems according to the antenna array configuration instruction, the correspondence includes one of the following types of correspondence:
a many-to-one correspondence between the multiple target electric motors and one of the modems;
a one-to-one correspondence between the multiple target electric motors and the multiple modems; and
a many-to-one correspondence between some target electric motors in the multiple target electric motors and some modems in the multiple modems, and a one-to-one correspondence between the other target electric motors in the multiple target electric motors and the other modems in the multiple modems; and a link establishing subunit, configured to establish a communications link between the target electric motors and the modems according to the correspondence.

13. The system according to claim 12, wherein the link establishing unit further comprises:

a link detecting unit, configured to detect, before the configuring unit establishes the correspondence, whether a communications link exists between the target electric motors and one of the modems; and a link disconnecting unit, configured to: when a detection result of the detecting unit is that a communications link exists, disconnect the existing communications link of the target electric motors.

14. The system according to claim 13, wherein the system further comprises:

an identifier acquiring unit that is connected to multiple electric motors and connected to the multiple AISG interfaces, wherein the identifier acquiring unit is configured to scan and acquire identification identifiers of the multiple electric motors and send, by using the AISG interfaces, the identification identifiers that are of the multiple electric motors and acquired by means of scanning to the configuration signal generating unit.

* * * * *